US00RE37968E

(19) United States
(12) Reissued Patent
Osborne et al.

(10) Patent Number: US RE37,968 E
(45) Date of Reissued Patent: Jan. 28, 2003

(54) DETONATOR ASSEMBLY

(75) Inventors: William E. Osborne, Guilford, CT (US); Harold J. Waterman, Jr., Wallingford, CT (US); David Findlay, Guilford, CT (US)

(73) Assignee: The Marlin Firearms Company, North Haven, CT (US)

(21) Appl. No.: 08/994,595

(22) Filed: Dec. 19, 1997

Related U.S. Patent Documents

Reissue of:
(64) Patent No.: 5,487,232
Issued: Jan. 30, 1996
Appl. No.: 08/233,134
Filed: Apr. 26, 1994

(51) Int. Cl.[7] ..... F41C 9/08
(52) U.S. Cl. ..... 42/51; 42/83; 42/1.05; 89/1.3; 89/26; 89/27.13
(58) Field of Search ..... 102/470, 430, 102/281; 42/51, 83, 1.05; 89/1.3, 27.13, 26

(56) References Cited

U.S. PATENT DOCUMENTS 2,428,398 A * 10/1947 Summerbell et al. ..... 89/26
2,504,162 A * 4/1950 Summerbell et al. ..... 89/27.13
3,656,250 A * 4/1972 Brown ..... 42/16
3,732,820 A * 5/1973 Hendricks ..... 102/470
4,027,592 A * 6/1977 Hubsch et al. ..... 89/26
4,560,061 A * 12/1985 Haytayan ..... 102/281
4,867,066 A * 9/1989 Buenemann, Jr. ..... 102/470
5,097,613 A * 3/1992 Miller et al. ..... 42/70.01
5,133,143 A * 7/1992 Knight ..... 42/51
5,297,491 A * 3/1994 Sippel et al. ..... 102/430
5,307,583 A * 5/1994 Mahn et al. ..... 42/51
5,333,403 A * 8/1994 Peifer ..... 42/51
5,365,851 A * 11/1994 Shaw ..... 102/275.6
5,737,863 A * 4/1998 Rainey, III ..... 42/51

FOREIGN PATENT DOCUMENTS

FR 1110473 * 2/1956 ..... 102/470

* cited by examiner

*Primary Examiner*—Stephen M. Johnson
(74) *Attorney, Agent, or Firm*—Alix, Yale & Ristas, LLP

(57) ABSTRACT

An improved detonator assembly for a black powder firearm having a breech block, a receiver, and a nipple. The detonator assembly comprises a primer and a primer carrier. The primer carrier has an axial bore dimensioned to receive the primer at one end and slip over the firearm nipple at the opposite end. The primer carrier has a lip that abuts the breech block rear end. A tab laterally extends from the lip to provide a handle for installing and removing the assembly and a visual indication that the firearm is primed.

28 Claims, 3 Drawing Sheets

DETONATOR ASSEMBLY

Matter enclosed in heavy brackets [ ] appears in the original patent but forms no part of this reissue specification; matter printed in italics indicates the additions made by reissue.

BACKGROUND OF THE INVENTION

This invention relates generally to devices for detonating explosive charges in firearms. More particularly, the present invention relates to detonator assemblies for use in black powder firearms.

Although metallic cartridges and smokeless powder supplanted black powder as the preferred type of propellant in the period following the American Civil War, black powder has recently experienced a resurgence of popularity. Currently, black powder firearms are utilized for a variety of purposes including hunting, target shooting, and the reenactment of historical events.

Black powder firearms utilize as the propellant a main charge of black powder inserted into the barrel. This main charge is typically ignited by a spark or burning particles that are transmitted to the main charge though a passageway in the barrel and breech block. The method of supplying these sparks or burning particles largely depends on the degree of historical accuracy that is required for the firearm. Flintlocks and percussion caps were the predominant methods historically and generally are the predominant methods utilized today.

Flint and powder proved to be the earliest ignition mode having widespread popularity, but was subject to a number of significant problems. Principally, flint and powder ignition was subject to misfires due to loss of powder or damp powder. Percussion caps eventually provided greater reliability by eliminating the powder train.

Percussion caps are the preferred method for uses that do not require strict historical accuracy, such as hunting and target shooting. Percussion caps fit over a nipple having a throughbore. When struck by a firing pin or hammer, the percussion cap detonates and sends a flash of flame through the nipple throughbore to ignite the main powder charge. Although percussion caps are more reliable than flint, the design has experienced little technological improvement since black powder was supplanted by metallic cartridges and smokeless powder at the turn of the century. Percussion caps are relatively small and require a capper for loading and unloading. The force of detonation sometimes causes catastrophic failure of the cap causing pieces of the cap to fly off during firing. The nipple throughbore provides a passage for the escape of gases from the main powder charge. Many of the improvements to the percussion cap type of firearm have been concerned with directing the escaping gas to prevent it from becoming a hazard to the person operating the firearm.

Black powder substitutes, such as Pyrodex™ powder, are also now commonly used as the main powder charge. Such substitutes typically require greater thermal energy for reliable ignition than black powder. Consequently, conventional percussion caps designed for use with black powder may not provide sufficient thermal energy to reliably ignite these substitutes.

SUMMARY OF THE INVENTION

Briefly stated, the invention in a preferred form is a detonator assembly comprising a primer and a primer carrier. The assembly is preferably employed in a conventional black powder firearm having a nipple, a breech block, and a receiver. The primer is preferably a standard shotshell primer although it may be any commercially available primer. The primer carrier has a stepped axial bore that receives the primer at one end and the firearm nipple at the opposite end. The carrier bore is dimensioned so that the primer is insertable into the bore in a light press fit fashion. The primer carrier has a lip that abuts the rear end of the breech block. A portion of the lip forms a laterally extending tab that provides a handle for installing and removing the assembly.

The primer carrier and the primer cooperate to provide an improved detonator assembly for use in a black powder firearm. A primer such as employed in the detonator assembly typically requires less striker/hammer energy than a percussion cap for reliable ignition. Because the primer generates greater thermal energy than conventional percussion caps, the detonator assembly produces reliable ignition of black powder substitutes.

An object of the present invention is to provide a new and improved detonator assembly for black powder firearms.

Another object of the invention is to provide a detonator assembly which has an efficient construction and does not require special tools for installation and removal.

A further object of the invention is to provide a detonator assembly that retains its physical integrity and captures substantially all combustion gases upon detonation.

A further object of the invention is to provide a new and improved detonator assembly which provides a clear visual indication that the forearm is ready to fire.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DETAILED DESCRIPTION OF THE PREFERRED EMBODIMENT

Figure 1:
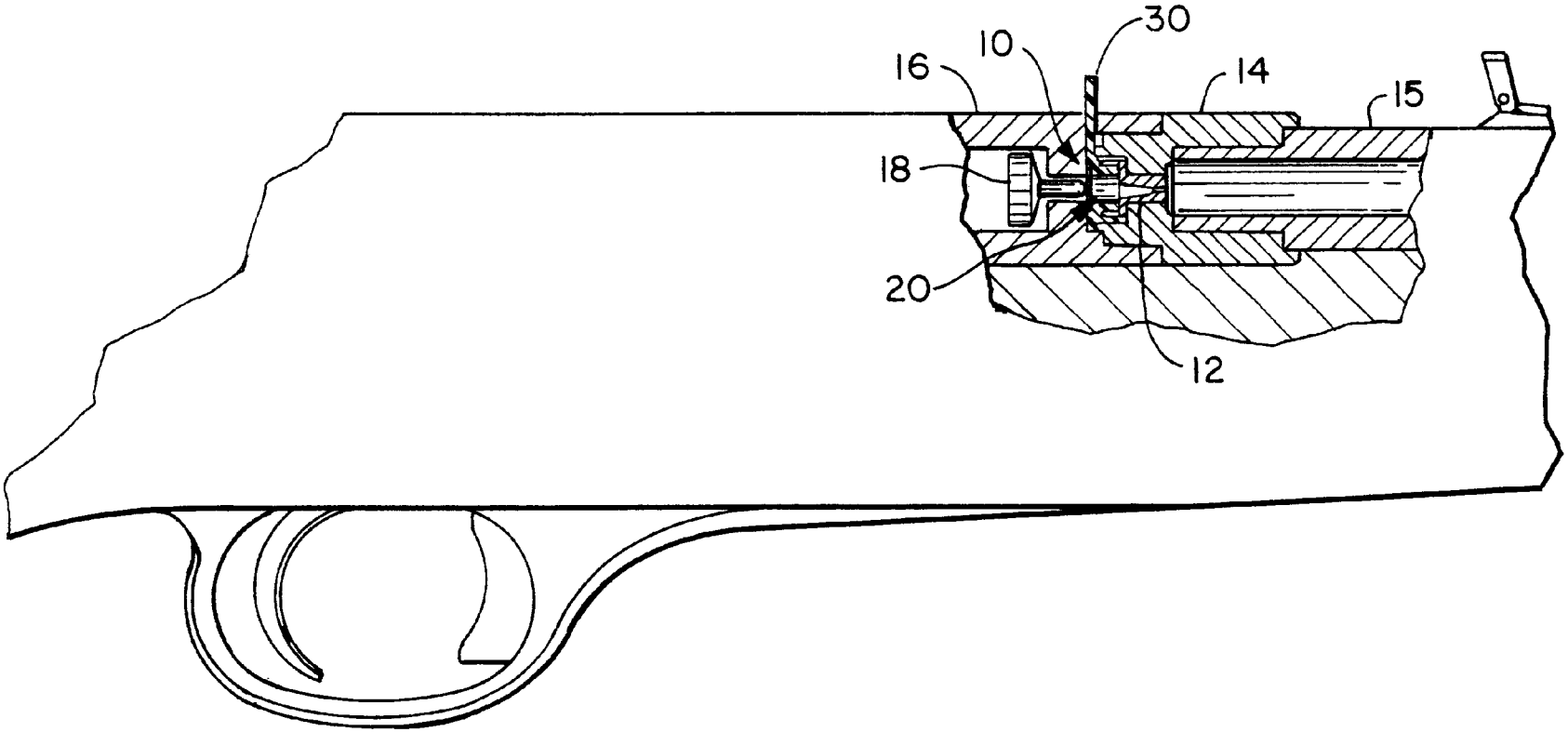
FIG. 1 is a fragmentary longitudinal view, partly broken away and partly in section, of a firearm having a detonator assembly in accordance with the present invention.
Figure 2:
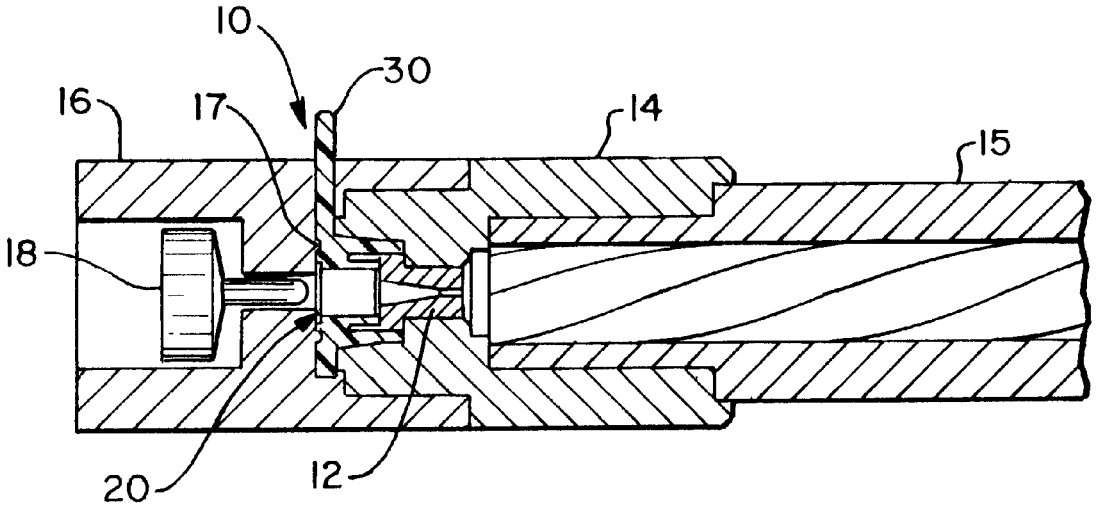
FIG. 2 is a longitudinal sectional view through the rear part of the barrel, breech block, receiver, and detonator assembly of the firearm of FIG. 1.

With reference to the drawings wherein like numerals represent like parts throughout the several figures, a detonator assembly in accordance with the present invention is generally designated by the numeral 10. The detonator assembly 10 is preferably employed in a conventional black powder firearm. Such firearms typically have a nipple 12, a breech block 14, a barrel 15, a receiver 16, and a firing pin 18. The detonator assembly is dimensioned to be closely received in the breech block opposite the firing pin and partially slip over the nipple 12.

Figure 3:
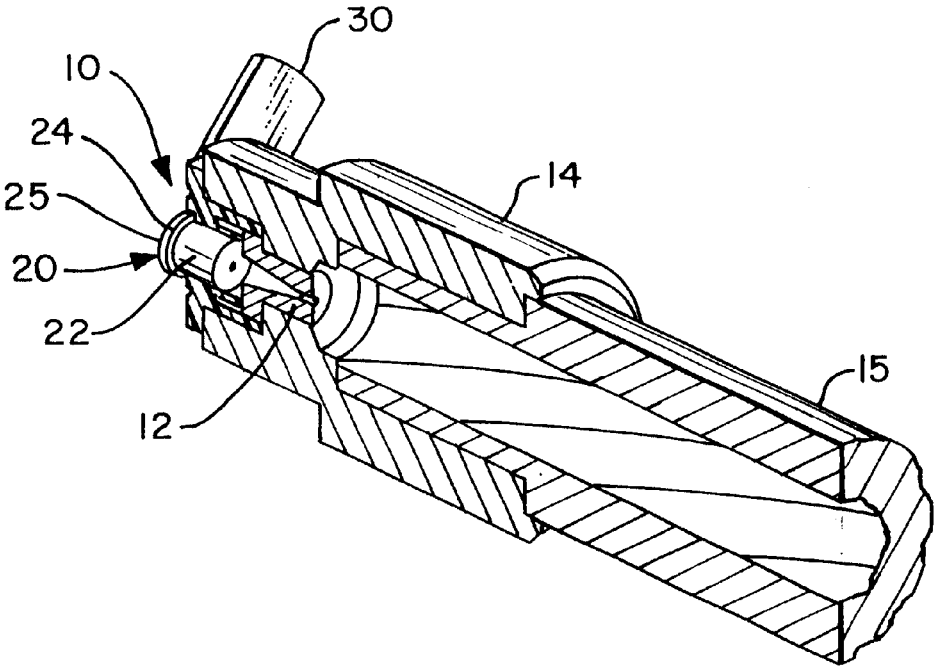
FIG. 3 is a perspective sectional view of the barrel, breech block, and detonator assembly of the firearm of FIG. 1.

The detonator assembly 10 comprises a primer 20 and a primer carrier 30. The primer 20 is preferably a standard shotshell primer. Alternatively, the primer 20 may be any commercially available primer. Such primers are readily available and may typically require approximately 65% less striker/hammer energy than a conventional percussion cap for reliable ignition. Additionally, primers provide more thermal energy than the conventional percussion cap for ignition of the main powder charge. The primer 20 preferably has cylindrical forward body portion 22 and a flattened rear end 24, forming a circumferential rim 25, as best illustrated in FIG. 3.

Figure 4:
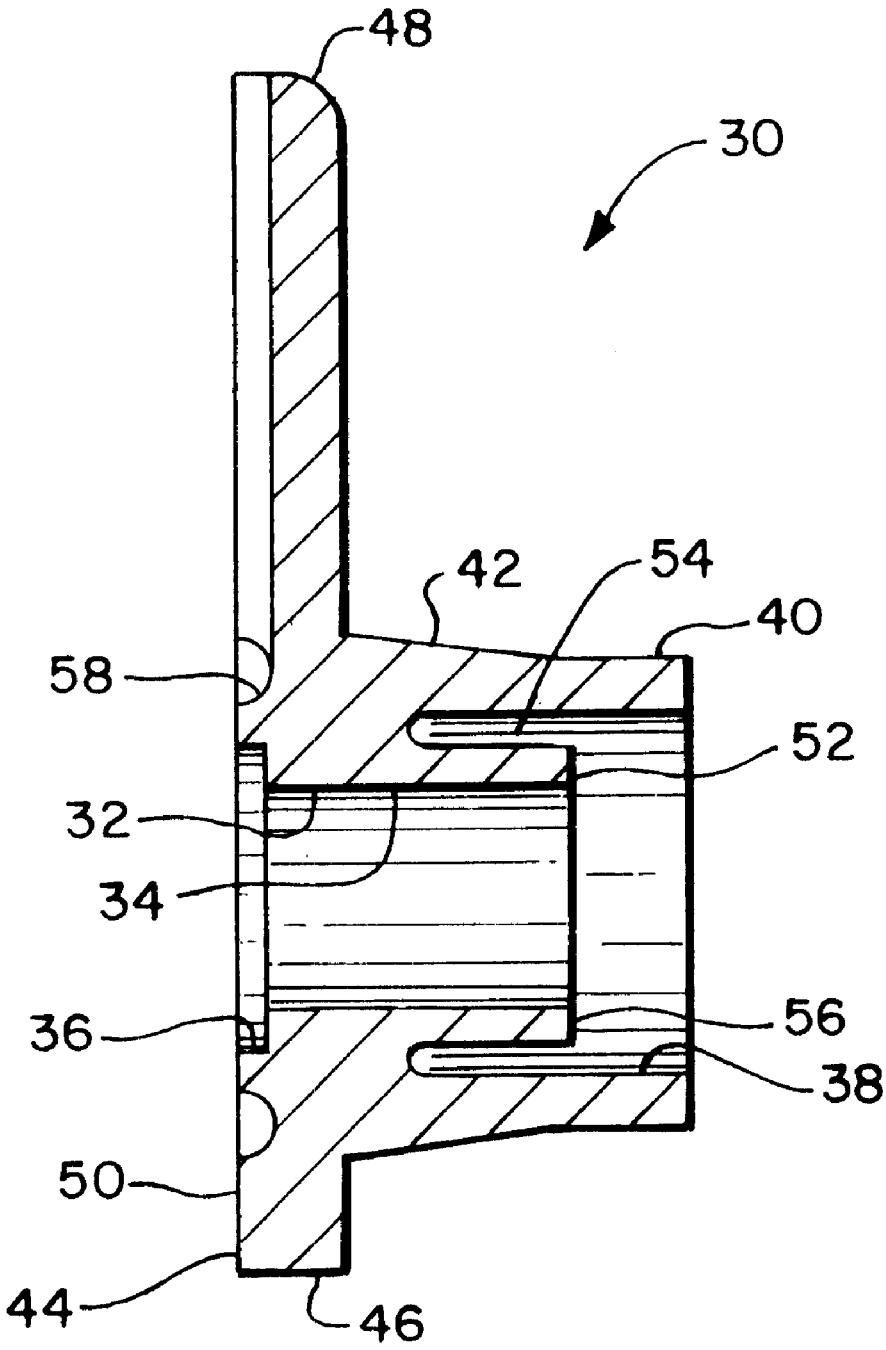
FIG. 4 is an enlarged longitudinal sectional view of the primer carrier of FIG. 1.

With reference to FIG. 4, the primer carrier 30 is an integral molded member having a plastic composition. Alternatively, the primer carrier 30 may be comprised of separate barrel end portion 42 and tab portion 48. The primer carrier 30 may also be comprised of a combination of plastic and other material to form a composite structure. The carrier 30 has a central axial bore 32 comprised of a cylindrical cavity 34 having a constant diameter and two coaxial bores 36, 38 of enlarged diameters at opposite ends of the cavity 34. Cavity 34 is dimensioned to axially slidably receive the primer body portion 22. The diameter of the cavity 34 is dimensioned to provide a light press fit with the received primer cylindrical portion 22. The diameter of the first partial bore 36 is dimensioned to receive and enclose the primer flattened rim 25. The first bore 36 has an axial dimension which allows the primer flattened end 24 to be approximately flush with the primer carrier rear surface 50. The diameter of the forward bore 38 is dimensioned to slip over the breech-end of the nipple 12.

The primer carrier barrel-end portion 40 is cylindrically shaped and axially dimensioned for reception in the breech block 14. An intermediate portion 42 of the primer carrier may have a frustoconical shape to provide more material and greater structural strength around the received primer 20. The primer carrier breech-end or rear end portion 44 has a lip 46 that abuts the rear end of the breech block to provide a seal interface to prevent gas leakage.

The primer carrier rear surface 50 may have a groove 58 that closely mates with a partial ring 17 projecting from the front surface of the receiver. This arrangement provides a seal preventing combustion gasses from blowing back into the face of the operator of the firearm.

The breech-end portion of the cavity 34 is defined by a deformable sleeve 56. Sleeve 56 terminates in an annular surface 52. Surface 52 engages the end of the nipple to provide a gas seal. A circumferential annular recess 54 positioned between the outer surface of the carrier 30 and the inner surface of the cavity 34 surrounds sleeve 56. The sleeve 56 elastically deforms partially into the recess upon primer detonation to absorb lateral forces and prevent binding of the primer carrier 30 in the breech block 14.

A tab 48 integrally laterally projects from a portion of the lip. The tab 48 facilitates handling of the carrier 30 by providing an easily graspable handle to facilitate loading and unloading of the detonator assembly. Additionally, the tab 48 extends through the receiver 16 to provide a clear visual indication that the firearm is primed. The tab 48 may be brightly colored to facilitate this function. The tab 48 may also carry a printed or molded safety message or manufacturer's logo (not illustrated).

While preferred embodiments have been shown and described, various modifications and substitutions may be made thereto without departing from the spirit and scope of the invention. Accordingly, it is to be understood that the present invention has been described by way of illustration and not limitation.

[what] *What* is claimed is:

1. A detonator assembly for a black powder firearm having a nipple and a breech block having an axial bore for receiving said detonator assembly, said detonator assembly comprising:

primer means having a cylindrical first portion and a generally flattened end; and a primer carrier having a first end, a first portion dimensioned to receive said primer means, and a second portion dimensioned for partially receiving the firearm nipple, said primer carrier second portion comprising first and second coaxial sleeve means defining an interior circumferential annular recess, said second sleeve means defining a sealing surface for sealing with the nipple.

2. The detonator assembly of claim 1 wherein said primer carrier first end further comprises a lip.

3. The detonator assembly of claim 2 wherein said primer carrier first end further comprises handle means integrally extending from a portion of said lip.

4. The detonator assembly of claim 1 wherein said primer means is mounted in press-fit relationship to said first portion.

5. The detonator assembly of claim 1 wherein said second sleeve means is deformable upon detonation of said primer whereby lateral forces imposed on said primer carrier are absorbed by said second sleeve means.

6. The detonator assembly of claim 1 wherein said primer carrier first end has a rear surface defining a groove, said groove defining an annulus, said annulus being coaxial with said first and second sleeve means.

7. A firearm comprising:

receiver means having a firing pin;

trigger means for actuating said pin;

barrel means;

breech block means comprising a breech block having an axial bore;

nipple means disposed in said bore and communicating with said barrel; and a detonator assembly disposed in said axial bore, said detonator assembly comprising primer means and a primer carrier, said primer means being engageable by said pin and having a cylindrical first portion and a generally flattened end, said primer carrier having a first end, a first portion dimensioned to receive said primer means, a second portion dimensioned for partially slipping over said nipple means and absorber means for accommodating deformation of said primer carrier on detonation of said primer whereby lateral forces imposed on said primer carrier are absorbed by said absorber means.

8. The firearm of claim 7 wherein said absorber means comprises first and second sleeve means defining an interior circumferential annular recess, said second sleeve means defining a sealing surface for sealing with said nipple means.

9. The firearm of claim 7 wherein said primer first end further comprises a lip which seals between said breech block and said receiver means.

10. The firearm of claim 9 wherein said primer carrier first end further comprises handle means integrally extending from a portion of said lip.

11. The firearm of claim 10 wherein said handle means extends outwardly from said breech block means whereby said handle means provides a visible indication that said firearm is primed.

12. The firearm of claim 7 wherein said primer carrier first end further has a rear surface defining a groove, said groove defining an annulus, said annulus being coaxial with said first portion, wherein said groove receives a partial ring projecting from a front surface of the receiver means whereby the primer carrier first end is sealed.

13. The firearm of claim 7 wherein said primer means is mounted in press-fit relationship to said first portion.

14. A primer carrier for a black powder firearm having a nipple, a primer and a breech block having an axial bore for receiving said primer carrier, said primer carrier comprising an outside surface, a first end, a first end portion having an inside surface and being dimensioned to receive the primer, and a second end portion dimensioned for partially slipping over the nipple, said second end portion comprising first and second sleeve means defining a circumferential annular recess said second sleeve means defining a sealing surface for sealing with the nipple.

15. The primer carrier of claim 14 wherein said second sleeve means is deformable upon detonation of said primer whereby lateral forces imposed on said primer carrier are absorbed by said second sleeve means.

16. The primer carrier of claim 14 wherein said primer carrier first end further comprises a lip.

17. The primer carrier of claim 16 wherein said primer carrier first end further comprises handle means integrally extending from a portion of said lip.

18. The primer carrier of claim 14 wherein said primer carrier first end further has a rear surface defining a groove, said groove defining an annulus, said annulus being coaxial with said first and second sleeve means.

19. The primer carrier of claim 14 wherein said primer carrier is composed of a plastic material.

20. A firearm comprising:

receiver means having a firing pin;

trigger means for actuating said pin;

barrel means;

breech block means comprising a breech block having an axial bore;

nipple means disposed in said bore and communicating with said barrel; and a detonator assembly disposed in said axial bore, said detonator assembly comprising primer means and a primer carrier, said primer means being engageable by said pin and having a cylindrical first portion and a generally flattened end, said primer carrier having a first end, a first portion dimensioned to receive said primer means, and a second portion dimensioned for partially slipping over said nipple means, said primer carrier first end having a rear surface defining a groove, said groove defining an annulus, said annulus being coaxial with said first portion, wherein said groove receives a partial ring projecting from a front surface of the receiver means whereby the primer carrier first end is sealed.

*21. A firearm comprising:*

*a receiver having a firing pin;*

*a barrel;*

*a breech block mounted to said barrel and having an axial bore;*

*a primer being engageable by said pin and having a cylindrical first portion and a generally flattened end defining a flattened end surface; and*

*a primer carrier defining a first carrier bore, said primer carrier having a first end portion defining a partial second carrier bore coaxial with said first carrier bore, said first end portion defining a lateral surface, said primer carrier comprising a laterally extending tab and absorber means for accommodating deformation of said primer carrier on detonation of said primer whereby lateral forces imposed on said primer carrier are absorbed by said absorber means, said primer being disposed in said first carrier bore, said flattened end of said primer positioned in said second carrier bore and said flattened end surface of said primer is generally coplanar with said lateral surface, and said receiver supporting said primer carrier wherein said primer is aligned with said axial bore and said tab extends through said receiver to provide a visible indication that said firearm is primed.*

*22. The firearm of claim 21 wherein said primer carrier has a deformable inner sleeve portion defining said carrier bore and an outer carrier portion radially spaced apart from said inner sleeve portion.*

*23. The firearm of claim 21 wherein said primer carrier is plastic.*

*24. The firearm of claim 21 wherein said primer slidably engages said first carrier bore.*

*25. A firearm comprising:*

*a receiver having a firing pin;*

*a barrel;*

*a breech block mounted to said barrel and having an axial bore;*

*a primer being engageable by said pin and having a cylindrical first portion and a generally flattened end defining an end surface; and*

*a primer carrier defining a first carrier bore having a central axis, said primer carrier having a first end portion defining a lateral surface, said end surface of said primer is generally coplanar with said lateral surface, said primer carrier comprising an integral protruding tab and absorber means for accommodating deformation of said primer carrier on detonation of said primer whereby lateral forces imposed on said primer carrier are absorbed by said absorber means, said primer being disposed in said first carrier bore and said receiver supporting said primer carrier wherein said primer is aligned with said axial bore and said tab extends through said receiver to provide a visible indication that said firearm is primed.*

*26. The firearm of claim 25 wherein said primer carrier has a first end portion defining a partial second carrier bore coaxial with said first carrier bore, said flattened end of said primer positioned in said second carrier bore.*

*27. The firearm of claim 26 wherein said first end portion defines a lateral surface, said flattened end of said primer defines a flattened end surface, and said flattened end surface of said primer is generally coplanar with said lateral surface.*

*28. A firearm comprising:*

*a receiver having a firing pin;*

*a barrel;*

*a breach block mounted to said barrel and having an axial bore;*

*a primer being engageable by said pin and having a cylindrical first portion and a generally flattened end; and*

*a plastic primer carrier having a deformable inner sleeve portion and an outer carrier portion radially spaced apart from said inner sleeve portion defining a first carrier bore, said carrier having a laterally extending tab, said primer being disposed in said first carrier bore and said receiver supporting said primer carrier*

*wherein said primer is aligned with said axial bore and said tab extends through said receiver to provide a visible indication that said firearm is primed and wherein said inner sleeve portion comprises absorber means for accommodating deformation of said primer carrier on detonation of said primer whereby lateral forces imposed on said primer carrier are absorbed by said absorber means.*

* * * * *